(12) United States Patent
Bierach

(10) Patent No.: US 7,245,222 B2
(45) Date of Patent: Jul. 17, 2007

(54) CONTROLLING AN RFID READER BY OBSERVING A CHANGE IN INDUCTANCE

(75) Inventor: Kirk B. Bierach, Saratoga, CA (US)

(73) Assignee: Farpointe Data, Inc., Mountain View, CA (US)

( * ) Notice: Subject to any disclaimer, the term of this patent is extended or adjusted under 35 U.S.C. 154(b) by 235 days.

(21) Appl. No.: 11/041,078

(22) Filed: Jan. 14, 2005

(65) Prior Publication Data

US 2006/0170553 A1    Aug. 3, 2006

(51) Int. Cl.
G08B 13/14    (2006.01)
(52) U.S. Cl. .................. 340/572.4; 235/492; 340/10.1
(58) Field of Classification Search ............. 340/572.1, 340/572.4, 10.1, 10.3, 10.33, 10.4; 235/487, 235/492
See application file for complete search history.

(56) References Cited

U.S. PATENT DOCUMENTS

| 6,202,927 B1 * | 3/2001 | Bashan et al. .............. 235/492 |
| 6,476,708 B1 | 11/2002 | Johnson |
| 6,535,136 B1 | 3/2003 | Rodenbeck et al. |
| 6,905,074 B2 * | 6/2005 | Charrat ........................ 235/492 |

FOREIGN PATENT DOCUMENTS

| DE | 4440855 C2 | 5/1996 |
| DE | 19614215 C2 | 10/1997 |
| DE | 19853207 C2 | 5/2000 |
| EP | 0 391 559 | 10/1990 |
| EP | 0 944 014 | 9/1999 |
| WO | 03/052672 | 6/2003 |

OTHER PUBLICATIONS

International Search Report for International Application No. PCT/US2006/001407, date of mailing Jun. 21, 2006.

* cited by examiner

*Primary Examiner*—Thomas Mullen
(74) *Attorney, Agent, or Firm*—Thelen Reid Brown Raysman & Steiner LLP; David B. Richie (57) ABSTRACT

A method and apparatus for controlling a radio frequency identification (RFID) reader to detect the proximity of an RFID device based on observing a change in effective inductance. The RFID reader includes an excitation signal generator and a resonant filter that combined are capable of generating and transmitting a detection signal, an RFID device detector for measuring a detector parameter indicative of the change in effective inductance, and a detection signal receiver for determining whether an RFID device is present. The method includes awakening from a detection sleep state at a preselected time, generating and transmitting a detection signal, measuring at least one detector parameter indicative of the change in effective inductance, and determining whether the RFID device is present. When the RFID device is not present, the method returns to the detection sleep state and, when the RFID device is present, the method exits the detection sleep state.

36 Claims, 5 Drawing Sheets

CONTROLLING AN RFID READER BY OBSERVING A CHANGE IN INDUCTANCE

FIELD OF THE INVENTION

The present invention relates generally to a radio frequency transponder system having a radio frequency identification reader and a radio frequency identification device. More specifically, the present invention relates to a method and apparatus for controlling the radio frequency identification reader to detect the proximity of the radio frequency identification device based on observing a change in effective inductance.

BACKGROUND OF THE INVENTION

A radio frequency (RF) transponder system typically includes a radio frequency identification (RFID) reader and an RFID device. The system may include multiple RFID readers, multiple RFID devices, or both. The RFID device is commonly referred to as an RFID tag. The RFID device may take a number of forms including a card or a fob. Conventional operation of the RF transponder system is generally characterized by multiple operating modes including excitation, response, and read modes. The RF transponder system requires electrical power to operate in each of these modes. In particular, the RFID reader must be powered during the excitation and read modes while the RFID device must be powered during the response mode. In many RF transponder systems the RFID device is passive, that is, the RFID device lacks an internal power source or physical connection to an external power source. The passive RFID device is powered remotely by the RFID reader while the RFID device remains free of physical contact with the RFID reader. The RFID reader may be connected to an electrical power source, such as an AC power line, which powers the RFID reader. Alternatively, the RFID reader may be powered by a self-contained power source such as a small disposable or rechargeable battery. The latter enables the system designer to position the RFID reader in a remote location which lacks access to an AC power outlet. Typically, an output device that produces one or more outputs such as visual, audible, mechanical, or electrical outputs is coupled to the RF transponder system. One commonly experienced application is a security system that controls access to a building or zones within a building. Other applications also exist.

BRIEF SUMMARY OF THE INVENTION

A method and apparatus for controlling a radio frequency identification (RFID) reader to detect the proximity of an RFID device based on observing a change in effective inductance is disclosed. The RFID reader includes an excitation signal generator and a resonant filter that combined are capable of generating and transmitting a detection signal, an RFID device detector for measuring a detector parameter indicative of the change in effective inductance, and a detection signal receiver for determining whether an RFID device is present. The method includes awakening from a detection sleep state at a preselected time, generating and transmitting a detection signal, measuring at least one detector parameter indicative of the change in effective inductance, and determining whether the RFID device is present. When the RFID device is not present, the method returns to the detection sleep state and, when the RFID device is present, the method exits the detection sleep state.

BRIEF DESCRIPTION OF THE DRAWINGS

The accompanying drawings, which are incorporated into and constitute a part of this specification, illustrate one or more exemplary embodiments of the present invention and, together with the detailed description, serve to explain the principles and exemplary implementations of the invention.

In the drawings.

DETAILED DESCRIPTION OF THE INVENTION

Various exemplary embodiments of the present invention are described herein in the context of a method and apparatus for controlling an RFID reader by observing a change in effective inductance. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to exemplary implementations of the present invention as illustrated in the accompanying drawings. The same reference indicators will be used throughout the drawings and the following detailed descriptions to refer to the same or like parts.

In the interest of clarity, not all of the routine features of the exemplary implementations described herein are shown and described. It will of course, be appreciated that in the development of any such actual implementation, numerous implementation-specific decisions must be made in order to achieve the specific goals of the developer, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
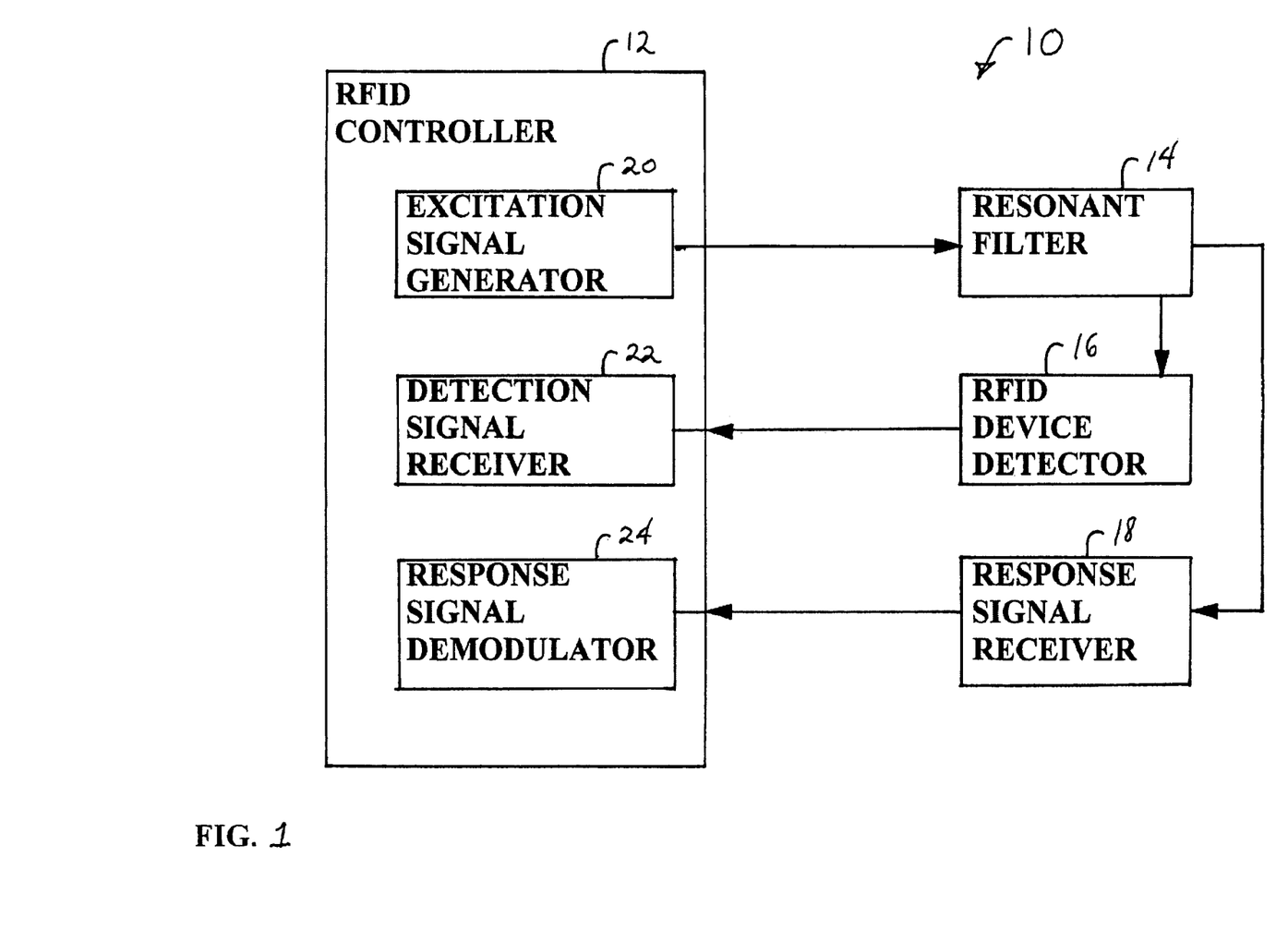
FIG. 1 is a block diagram of an RFID reader according to the present invention.

Turning first to FIG. 1, a block diagram of an RFID reader 10 according to the present invention is shown. The diagram has been simplified to include primarily elements of the RFID reader 10 that will be relevant to the discussion that follows. One of ordinary skill in the art will readily identify other elements that might also be included as desired or required. The identity and organization of the exemplary elements may not be strictly as shown. The various elements may be separated, combined, or reordered without departing substantially from the inventive concepts described herein. The RFID reader 10 includes an RFID controller 12, a resonant filter 14, an RFID device detector 16, and a response signal receiver 18. The RFID controller 12 performs a number of functions for the RFID reader 10. Although the RFID controller 12 is depicted as being a single unit, this would not necessarily be the case. The RFID controller 12 includes an excitation signal generator 20, a detection signal receiver 22, and a response signal demodulator 24. The response signal receiver 18, the excitation signal generator 20, the detection signal receiver 22, and the response signal demodulator 24 may be of conventional design or can be readily designed or modified by one of ordinary skill to operate consistently with the elements described in detail below.

Figure 2:
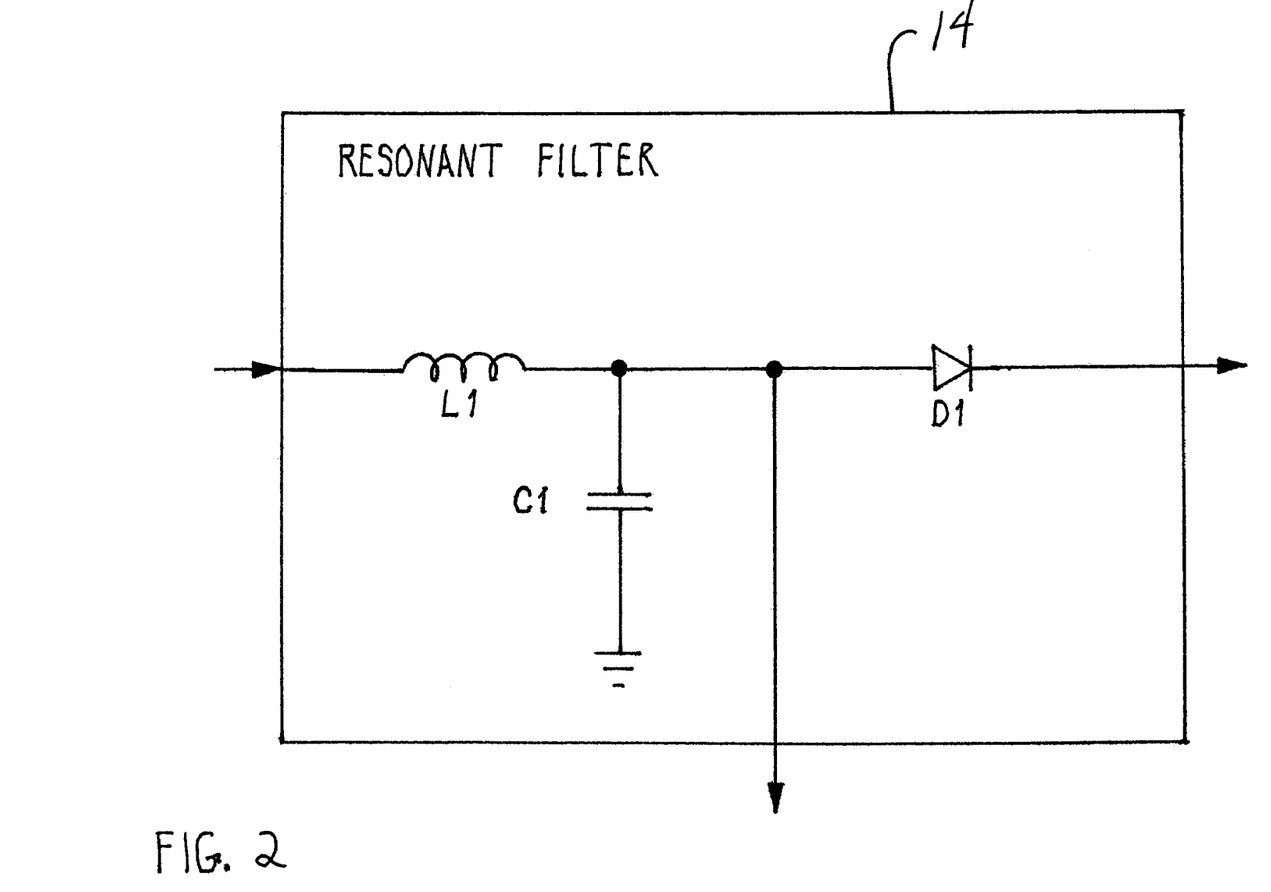
FIG. 2 is a schematic wiring diagram of an embodiment according to the present invention of the resonant filter of FIG. 1.

Turning now to FIG. 2, a schematic wiring diagram of an embodiment according to the present invention of the resonant filter 14 of FIG. 1 is shown. The resonant filter 14 includes an inductor L1 and a capacitor C1. The values of these elements are selected based on the particular application so as to resonate at a particular frequency. One common example would be 125 kHz for a transmitter coil. For the embodiment shown, it is assumed that the inductor L1 is operating both as a transmitter and as a receiver coil. It would also be possible to limit it to only transmission by making appropriate modifications and additions. The diode D1 is used to isolate the response signal receiver 18 of FIG. 1 from the resonant filter 14. Alternatively, the diode D1 might be located external to the resonant filter 14. The resonant filter 14 receives as an input an excitation signal from the excitation signal generator 20 of FIG. 1. The form and value of the excitation signal may vary with the particular application and mode of operation.

Figure 3:
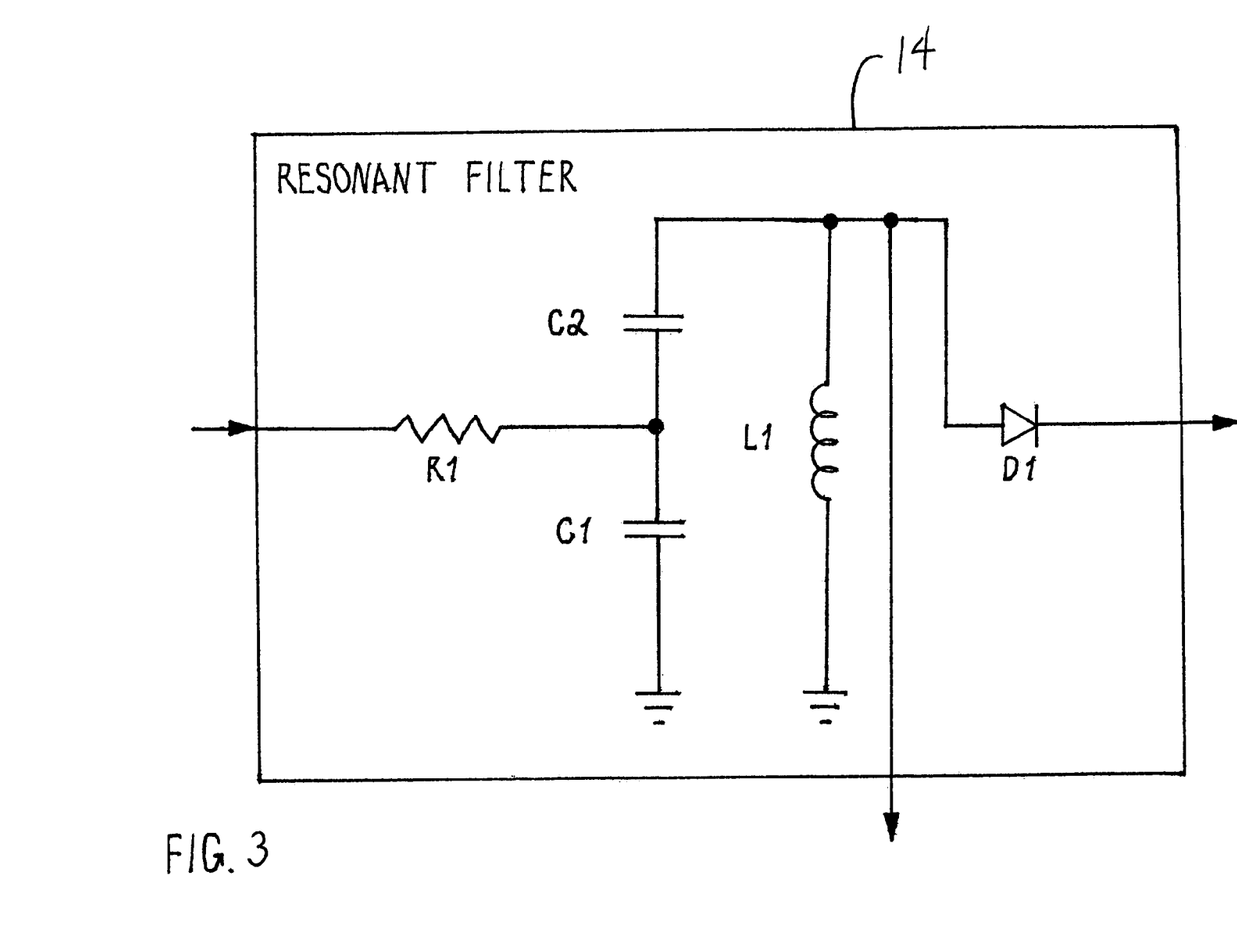
FIG. 3 is a schematic wiring diagram of an embodiment according to the present invention of the resonant filter of FIG. 1.

Turning now to FIG. 3, a schematic wiring diagram of an embodiment according to the present invention of the resonant filter 14 of FIG. 1 is shown. Similar to FIG. 2, the resonant filter 14 includes an inductor L1, a capacitor C1, and a diode D1. However, it further includes a resistor R1 and a second capacitor C2 connected as shown. The resonant filter 14 of FIG. 3 has a higher quality factor Q than that of FIG. 2. Both circuits are effective, but normally the higher that Q is, the greater the sensitivity in conjunction with the RFID device detector 16 of FIG. 1. Generally, higher sensitivity is desired, but this will depend on the circumstances. Other conventional techniques are possible and well known to further raise Q as desired or required. These techniques are considered to be included as part of the inventive concept without being described in detail herein for the sake of brevity.

Returning now to FIG. 1, the RFID device detection basics will be outlined. Together, the RFID device detector 16 and the detection signal receiver 22 detect the presence of an RFID device in proximity to the RFID reader 10. This is accomplished in part by measuring a detector parameter from the resonant filter 14 and analyzing the parameter as an indication of the presence of the RFID device. The input signal to the RFID device detector 16 is thus a preselected parameter that is measured for detection purposes. Recall that the RFID reader 10 and the RFID device do not necessarily come into physical contact with one another. This does not mean however that they may not have an electromagnetic influence on one another. As shown above with respect to FIGS. 2 and 3, the resonant filter 14 includes an inductor L1. Due to the proximity of the RFID device, it is possible to influence this inductor L1 and identify such an influence. The primary mechanism for electromagnetically influencing the inductor L1 is through mutual inductance. Although not illustrated, the RFID device also has at least one inductor or coil that serves as a receiver, a transmitter, or both. The inductor L1 and the RFID device coil are inductively coupled by bringing the RFID device into close proximity to the RFID reader 10. The degree of coupling, designated by the coefficient of coupling K, depends on several factors including the distance between the RFID reader and the RFID device. Generally, the higher that K is, the greater the effect is up to a theoretical maximum. Essentially, the inductor L1 and the RFID device coil momentarily form a transformer with an air core. Conventionally, this transformer is used to transfer data from the RFID device to the RFID reader 10, vice versa, or both. This is even now one possible scenario here, however, the transformer effect is further used to detect the presence of the RFID device prior to excitation and read modes. The addition of a detection mode to the three modes above allows for select portions of the RF transponder system to be placed in an energy saving state which will be referred to here as a detection sleep state. How exactly the detection sleep state will manifest itself in practice depends on the circumstances. For example, the response signal receiver 18 and the response signal demodulator 24 might be powered off during detection mode and powered on during one or more of the other three modes. Among various design factors, the system designer may have to balance energy savings against system response times and distances. Energy savings may be quite desirable in battery powered RFID reader applications.

When the RFID device is brought into close enough proximity to the RFID reader 10 for the mutual inductance to take effect, the effective inductance value of the resonant filter 14 is changed. During this close encounter, the resonant filter 14 temporarily exhibits a different resonant frequency. As a consequence and assuming the same input signal, the output signal parameters of the resonant filter 14 will be changed in voltage, current, and frequency. As part of the detection sequence, one or more of these parameters can be measured and monitored as will be further described below. A change in one or more of these parameters may indicate the presence of the RFID device and trigger a change in operating mode.

Figure 4:
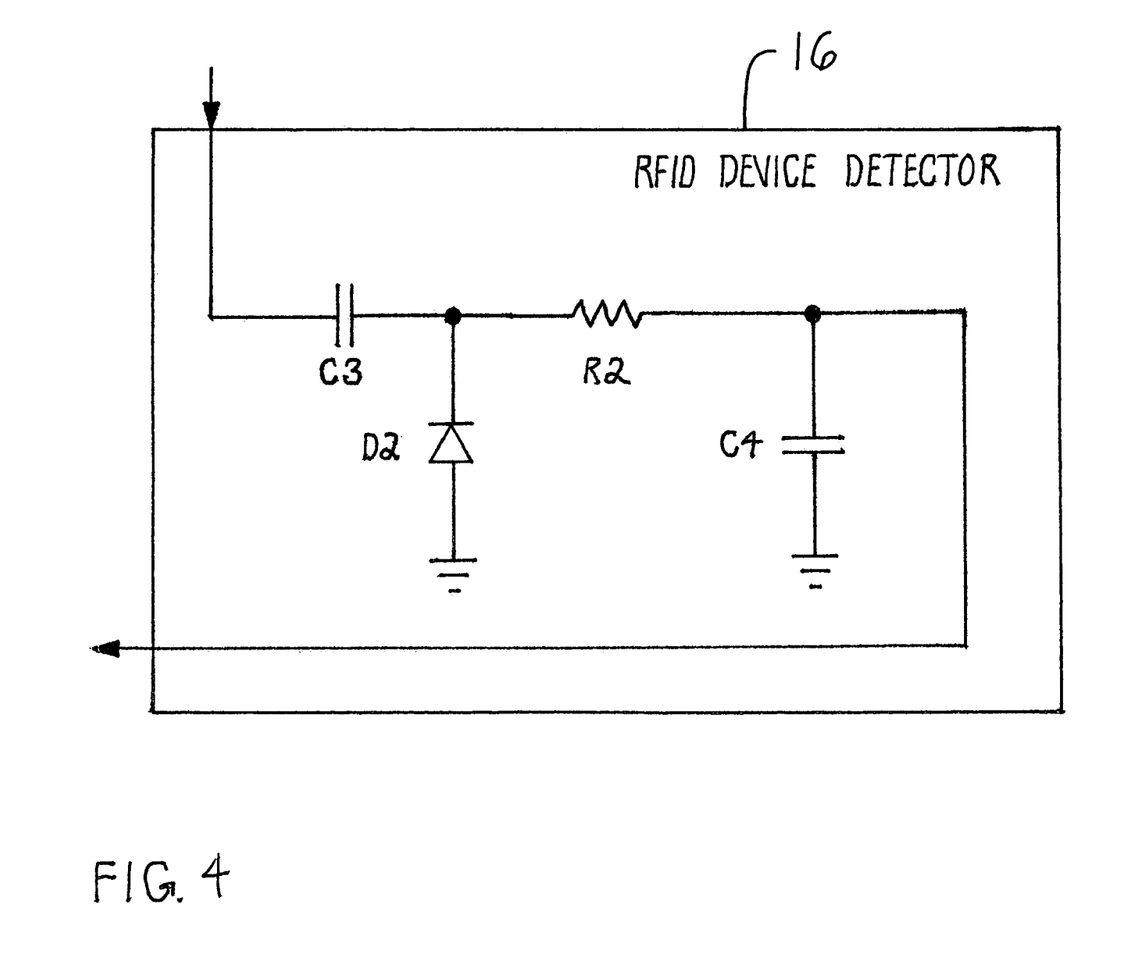
FIG. 4 is a schematic wiring diagram of an embodiment according to the present invention of the RFID device detector of FIG. 1.

Turning now to FIG. 4, a schematic wiring diagram of an embodiment according to the present invention of the RFID device detector 16 of FIG. 1 is shown. The RFID device detector 16 includes a first capacitor C3, a diode D2, a resistor R2, and a second capacitor C4 connected as shown. The first capacitor C3 serves to isolate the RFID device detector 16 from the resonant filter 14 of FIG. 1. The diode D2 is connected such that it never conducts but biases the circuit node above ground. The resistor R2 and the second capacitor C4 act as a low pass filter which blocks the AC component leaving only the DC bias signal. The output signal from the RFID device detector 16 is the DC bias voltage which is fed into the detection signal receiver 22 of FIG. 1. When an RFID device is brought into close proximity to the resonant filter and the effective inductance is changed, then the output voltage from the resonant filter 14 will change. This parameter change will be reflected as a voltage change in the output signal of the RFID device detector 16 and processed by the detection signal receiver 22. Generally, one of ordinary skill in the art will recognize that any means that allows for the detection of changes in one or more of the output parameters of the resonant filter 14 can be utilized as the RFID device detector 16 of the present invention. For example, among such means would be included a peak detector, a slope detector, a comparator, or an Analog-to-Digital (A/D) converter.

Returning again to FIG. 1, the RF transponder system operating modes of excitation, response, and read will be briefly outlined to provide context and contrast to the detection mode. The example sequence presented below is for discussion purposes only. The actual sequence will depend on the circumstances and may not be strictly as disclosed. Initially it is assumed either that there is no detection mode or that the detection mode has identified that an RFID device is present. When the RF transponder system transitions to the excitation mode, the RFID controller 12 of the RFID reader 10 utilizes the excitation signal generator 20 and the resonant filter 14 to generate an RF excitation signal. The RF excitation signal may take any of a number of forms. For example, the output of the excitation signal generator 20 might be a 125 kHz square wave and the output of the resonant filter 14 might be a 125 kHz sine wave. The RF excitation signal is transmitted by the transmitter antenna coil of the RFID reader 10 and received by the transmitter/receiver antenna coil of the RFID device. Upon receipt of the RF excitation signal, the RF transponder system transitions the RFID device to the response mode, wherein the RFID device is activated. When the RFID device is in the response mode, a transponder circuit within the RFID device generates an RF response signal. The RF response signal may take any of a number of forms and typically contains data associated with the RFID device which is of interest to the RFID reader 10. The RF response signal is transmitted by the transmitter/receiver antenna coil of the RFID device and is received by the receiver antenna coil of the RFID reader 10. The RF transponder system then transitions the RFID reader 10 to the read mode, wherein the RF response signal is received by the response signal receiver 18 and communicated to the response signal demodulator 24 where the data is extracted and may be further processed or forwarded as appropriate.

Figure 5:
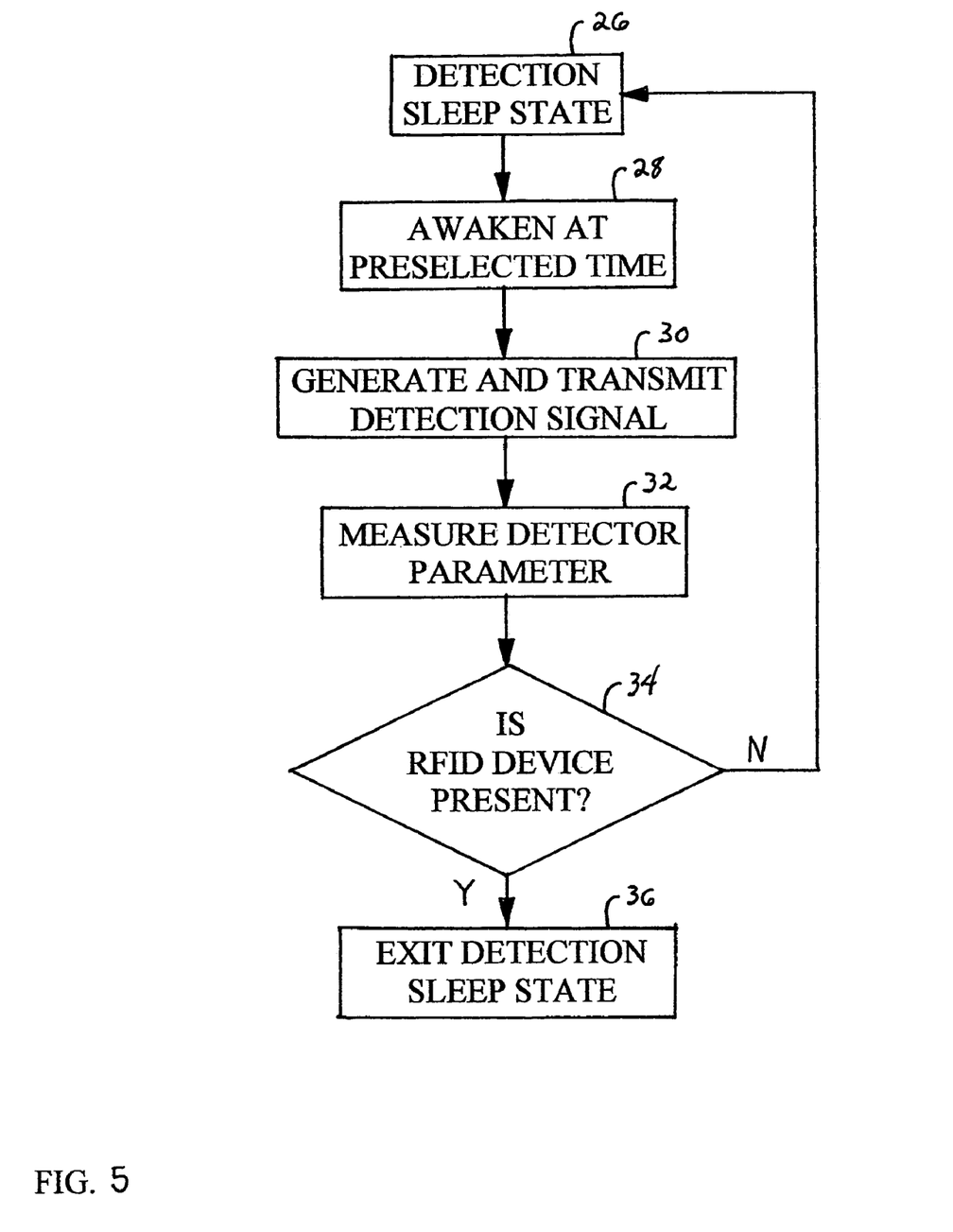
FIG. 5 is a flow diagram of the steps of the detection mode according to an embodiment of the present invention.

Turning now to FIG. 5, a flow diagram of the steps of the detection mode according to an embodiment the present invention is shown. The order of the blocks may not be exactly as shown with blocks being deleted or added. At block 26, the RF transponder system is in a detection sleep state. The assumption here is that there is no RFID device present at least as far as the RFID reader 10 knows or cares. As suggested above, the detection sleep state presents an opportunity for energy savings. While in the detection sleep state, select portions of the RF transponder system may be powered down or off. This may happen in a number of ways including all at once or in stages. It may depend on a number of factors such as the time of day or the level of power reserves. The elements of the RF transponder system may be designed and arranged to maximize the energy savings. This may come at the cost of additional or different hardware or of diminished operational performance. At block 28, the RFID reader 10 of FIG. 1 awakens at a preselected time. It may be that only portions of the RFID reader 10 awaken rather than the entire RFID reader 10. Further, the portions that do awaken may do so all at once or in stages. It may also be that some portions merely transition from waiting to active rather than from powered off to powered on. Any number of times may be selected depending on the circumstances. Generally, the greater the frequency and duration of awakenings, the shorter the response times and the lower the energy savings. At block 30, a detection signal is generated and transmitted. The detection signal probes the proximal space of the RFID reader 10 for the presence of a previously undetected RFID device. In the embodiment of FIG. 1, the excitation signal generator 20 and the resonant filter 14 perform this function. The respective output signals may take any number of forms including the same form as in the excitation mode outlined above. It would be possible however, to modify the magnitude or duration of the detection signal to save energy and time. For example, the detection signal might be generated for such a small number of cycles that the resonant filter 14 never reaches steady state, that is, detection is achieved during ramp up of the resonant filter 14. At block 32, at least one detector parameter is measured. Recall from above that one or more of the output parameters will change when the RFID device is present. In the embodiment of FIG. 1, the RFID device detector 16 performs this function. At decision block 34, a determination is made as to whether a previously undetected RFID device is present. The determination is based at least in part on the, one or more detector parameters that was measured in block 32. Any number of factors may influence the decision. For example, a lower decision threshold would tend to increase responsiveness at the expense of potential energy savings. Likewise, any number of decision criteria or combinations of criteria might be applied. For example, the decision might be based on a single absolute threshold, that is, a measured detector parameter greater than or equal to a certain predetermined value. The decision might be based on an average of some set of previously measured values, that is, a measured detector parameter greater than or equal to the average of the last ten measured values where no RFID device was detected. The decision might be based on a majority vote scheme, that is, a measured detector parameter greater than or equal to the majority of some set of previously measured values. It is worth noting that the decision criteria may be static or variable. For example, the decision criteria may change based on the time of day or level of power reserves. The decision criteria may change based on an evaluation process of how often an RFID device is actually read when it has been purportedly detected, that is, a high rate of false detections might call for a change in decision criteria. Another tactic to avoid false detections is for the decision criteria to be intrinsically self calibrating. This may aid in counteracting gradual or sudden changes in the system or the environment in which the system operates. One possible source of false detections might be sufficiently large ferrous materials such as metal objects. Small eddy currents in such metal objects may also affect the measured detector parameter thus potentially creating false detections. Through self calibration, both individual anomalies and long term variances can be accounted for. In the embodiment of FIG. 1, the detection signal receiver 22 performs the decision function at least in part. If at block 34 the determination is made that no RFID device is present, then the process returns to the detection sleep state represented by block 26. If at block 34 the determination is made that an RFID device is present, then the process proceeds to block 36. At block 36, the detection sleep state is exited. Upon exit, the RF transponder system will transfer to another mode of operation. Typically, this would be the excitation mode to begin reading from or writing to the newly detected RFID device. It is possible that any or all detection only elements of the RF transponder system may be placed into a power saving state until the detection mode is returned to by the system. For example, in the embodiment of FIG. 1, this might include the RFID device detector 16, the detection signal receiver 22, or both. The detection mode may be entered after start up of the RF transponder system or after the read mode, among others.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A radio frequency identification (RFID) reader comprising:
    an excitation signal generator and a resonant filter that combined are capable of generating and transmitting a detection signal;
    an RFID device detector for measuring a detector parameter indicative of a change in effective inductance of the resonant filter; and a detection signal receiver for determining whether an RFID device is in proximity of the RFID reader based on observing the change in effective inductance, wherein the resonant filter has an input and an output and comprises:
    an inductor having a first node and a second node wherein the first node is connected to the input and the second node is connected to the output; and
    a capacitor having a first node and a second node wherein the first node is connected to the output and the second node is connected to a constant voltage potential.

2. The RFID reader as defined in claim 1, wherein the RFID device detector comprises a comparator.

3. The RFID reader as defined in claim 1, wherein the RFID device detector comprises an Analog-to-Digital converter.

4. The RFID reader as defined in claim 1, wherein the excitation signal generator and the detection signal receiver are included among the elements of an RFID controller.

5. The RFID reader as defined in claim 4, wherein the RFID controller further comprises a response signal demodulator for extracting data from a response signal received from the RFID device.

6. The RFID reader as defined in claim 5, further comprising a response signal receiver for receiving the response signal.

7. A radio frequency identification (RFID) reader comprising:
    an excitation signal generator and a resonant filter that combined are capable of generating and transmitting a detection signal;
    an RFID device detector for measuring a detector parameter indicative of a change in effective inductance of the resonant filter; and a detection signal receiver for determining whether an RFID device is in proximity of the RFID reader based on observing the change in effective inductance, wherein the resonant filter has an input and an output and comprises:
    a resistor having a first node and a second node wherein the first node is connected to the input;
    a first capacitor having a first node and a second node wherein the first node is connected to the second node of the resistor and the second node is connected to a constant voltage potential;
    a second capacitor having a first node and a second node wherein the first node is connected to the second node of the resistor and the second node is connected to the output;
    an inductor having a first node and a second node wherein the first node is connected to the output and the second node is connected to the constant voltage potential.

8. The RFID reader as defined in claim 7, wherein the RFID device detector has an input and an output and comprises:
    a first capacitor having a first node and a second node wherein the first node is connected to the input;
    a diode having an anode and a cathode wherein the anode is connected to the second node of the first capacitor and the cathode is connected to a constant voltage potential;
    a resistor having a first node and a second node wherein the first node is connected to the second node of the first capacitor and the second node is connected to the output; and
    a second capacitor having a first node and a second node wherein the first node is connected to the output and the second node is connected to the constant voltage potential.

9. The RFID reader as defined in claim 7, wherein the RFID device detector comprises a peak detector.

10. The RFID reader as defined in claim 7, wherein the RFID device detector comprises a slope detector.

11. The RFID reader as defined in claim 7, wherein the RFID device detector comprises a comparator.

12. The RFID reader as defined in claim 7, wherein the RFID device detector comprises an Analog-to-Digital converter.

13. A radio frequency identification (RFID) reader comprising:
    an excitation signal generator and a resonant filter that combined are capable of generating and transmitting a detection signal;
    an RFID device detector for measuring a detector parameter indicative of a change in effective inductance of the resonant filter; and a detection signal receiver for determining whether an RFID device is in proximity of the RFID reader based on observing the change in effective inductance, wherein the RFID device detector has an input and an output and comprises:
    a first capacitor having a first node and a second node wherein the first node is connected to the input;
    a diode having an anode and a cathode wherein the anode is connected to the second node of the first capacitor and the cathode is connected to a constant voltage potential;
    a resistor having a first node and a second node wherein the first node is connected to the second node of the first capacitor and the second node is connected to the output; and
    a second capacitor having a first node and a second node wherein the first node is connected to the output and the second node is connected to the constant voltage potential.

14. A radio frequency identification (RFID) reader comprising:
    an excitation signal generator and a resonant filter that combined are capable of generating and transmitting a detection signal;
    an RFID device detector for measuring a detector parameter indicative of a change in effective inductance of the resonant filter; and a detection signal receiver for determining whether an RFID device is in proximity of the RFID reader based on observing the change in effective inductance, wherein the RFID device detector comprises a peak detector or a slope detector.

15. A method for detecting the presence of a radio frequency identification (RFID) device in the proximity of an RFID reader by observing a change in effective inductance of a resonant filter of the RFID reader, the method comprising:
    generating and transmitting a detection signal;
    measuring at least one detector parameter indicative of the change in effective inductance; and determining whether the RFID device is present,
wherein prior to generating and transmitting the method is in a detection sleep state and the method further comprises:
awakening from the detection sleep state at a preselected time;
when the RFID device has been determined not to be present, returning to the detection sleep state; and
when the RFID device has been determined to be present, exiting the detection sleep state.

16. The method as defined in claim 15, wherein the detection sleep state enables energy savings by the RFID reader.

17. The method as defined in claim 15, wherein the detection signal is such that the resonant filter may not achieve steady state during the time period of generation and transmission.

18. The method as defined in claim 15, wherein the at least one detector parameter comprises a voltage.

19. The method as defined in claim 15, wherein the at least one detector parameter comprises a current.

20. The method as defined in claim 15, wherein determining whether the RFID device is present comprises comparing the at least one detector parameter to a threshold.

21. The method as defined in claim 15, wherein determining whether the RFID device is present comprises decision criteria that are static.

22. A method for detecting the presence of a radio frequency identification (RFID) device in the proximity of an RFID reader by observing a change in effective inductance of a resonant filter of the RFID reader, the method comprising:
generating and transmitting a detection signal;
measuring at least one detector parameter indicative of the change in effective inductance; and
determining whether the RFID device is present, wherein determining whether the RFID device is present comprises comparing the at least one detector parameter to an average of a set of previous detector parameter measurements.

23. A method for detecting the presence of a radio frequency identification (RFID) device in the proximity of an RFID reader by observing a change in effective inductance of a resonant filter of the RFID reader, the method comprising:
generating and transmitting a detection signal;
measuring at least one detector parameter indicative of the change in effective inductance; and
determining whether the RFID device is present,
wherein determining whether the RFID device is present comprises comparing the at least one detector parameter to a majority vote based on a set of previous detector parameter measurements.

24. A method for detecting the presence of a radio frequency identification (RFID) device in the proximity of an RFID reader by observing a change in effective inductance of a resonant filter of the RFID reader, the method comprising:
generating and transmitting a detection signal;
measuring at least one detector parameter indicative of the change in effective inductance; and
determining whether the RFID device is present,
wherein determining whether the RFID device is present comprises decision criteria that are dynamic.

25. The method as defined in claim 24, wherein the decision criteria are self calibrating.

26. An apparatus for detecting the presence of a radio frequency identification (RFID) device in the proximity of an RFID reader by observing a change in effective inductance of a resonant filter of the RFID reader, the apparatus comprising:
means for generating and transmitting a detection signal;
means for measuring at least one detector parameter indicative of the change in effective inductance; and
means for determining whether the RFID device is present,
wherein, prior to generating and transmitting a detection signal, the apparatus is in a detection sleep state and the apparatus further comprises:
means for awakening from the detection sleep state at a preselected time;
means for, when the RFID device has been determined not to be present, returning to the detection sleep state; and
means for, when the RFID device has been determined to be present, exiting the detection sleep state.

27. The apparatus as defined in claim 26, wherein the detection sleep state enables energy savings by the RFID reader.

28. The apparatus as defined in claim 26, wherein the detection signal is such that the resonant filter may not achieve steady state during the time period of generation and transmission.

29. The apparatus as defined in claim 26, wherein the at least one detector parameter comprises a voltage.

30. The apparatus as defined in claim 26, wherein the at least one detector parameter comprises a current.

31. The apparatus as defined in claim 26, wherein the means for determining whether the RFID device is present comprises means for comparing the at least one detector parameter to a threshold.

32. The apparatus as defined in claim 26, wherein the means for determining whether the RFID device is present comprises decision criteria that are static.

33. An apparatus for detecting the presence of a radio frequency identification (RFID) device in the proximity of an RFID reader by observing a change in effective inductance of a resonant filter of the RFID reader, the apparatus comprising:
means for generating and transmitting a detection signal;
means for measuring at least one detector parameter indicative of the change in effective inductance; and
means for determining whether the RFID device is present, wherein the means for determining whether the RFID device is present comprises means for comparing the at least one detector parameter to an average of a set of previous detector parameter measurements.

34. An apparatus for detecting the presence of a radio frequency identification (RFID) device in the proximity of an RFID reader by observing a change in effective inductance of a resonant filter of the RFID reader, the apparatus comprising:
means for generating and transmitting a detection signal;
means for measuring at least one detector parameter indicative of the change in effective inductance; and
means for determining whether the RFID device is present, wherein the means for determining whether the RFID device is present comprises means for comparing the at least one detector parameter to a majority vote based on a set of previous detector parameter measurements.

35. An apparatus for detecting the presence of a radio frequency identification (RFID) device in the proximity of an RFID reader by observing a change in effective inductance of a resonant filter of the RFID reader, the apparatus comprising:

means for generating and transmitting a detection signal;

means for measuring at least one detector parameter indicative of the change in effective inductance; and means for determining whether the RFID device is present, wherein the means for determining whether the RFID device is present comprises decision criteria that are dynamic.

36. The apparatus as defined in claim 34, wherein the decision criteria are self calibrating.

* * * * *